United States Patent [19]

Ekstrand

[11] Patent Number: 4,986,645
[45] Date of Patent: Jan. 22, 1991

[54] GUN SIGHTING TELESCOPE

[75] Inventor: John A. I. Ekstrand, Ocala, Fla.

[73] Assignee: Interaims Aktiebolag, Malmo, Sweden

[21] Appl. No.: 269,788

[22] PCT Filed: May 9, 1986

[86] PCT No.: PCT/SE86/00218
§ 371 Date: Nov. 9, 1988
§ 102(e) Date: Nov. 9, 1988

[87] PCT Pub. No.: WO87/07004
PCT Pub. Date: Nov. 19, 1987

[51] Int. Cl.⁵ .............................................. G02B 23/00
[52] U.S. Cl. ..................................... 350/560; 350/561; 350/565
[58] Field of Search ............... 350/560, 561, 562, 563, 350/565, 571, 572

[56] References Cited

U.S. PATENT DOCUMENTS

| 3,213,539 | 10/1965 | Burris | 33/246 |
| 3,340,614 | 9/1967 | Leatherwood | 33/246 |
| 3,431,652 | 3/1969 | Leatherwood | 33/246 |
| 4,255,013 | 3/1981 | Allen | 350/560 |
| 4,389,791 | 6/1983 | Ackerman | 33/246 |
| 4,789,231 | 12/1988 | Shimizu | 350/565 |

FOREIGN PATENT DOCUMENTS

| 2259913 | 12/1972 | Fed. Rep. of Germany . |
| 2042638 | 5/1970 | France . |
| 7036963 | 10/1970 | France . |

Primary Examiner—Bruce Y. Arnold
Assistant Examiner—Ronald M. Kachamarik
Attorney, Agent, or Firm—Birch, Stewart, Kolasch & Birch

[57] ABSTRACT

The invention relates to a gun sighting telescope with adjustable magnification and is characterized by an arrangement (10, 11) by which elevation adjustment of the sighting telescope is automatically controlled when the magnification factor of the sighting telescope is changed, preferably such that the elevation adjustment automatically compensates for a bullet drop along a known trajectory when the magnification factor is controlled such that the image of a target viewed from said sighting telescope at different ranges therefrom appears to be unchanged in size.

4 Claims, 1 Drawing Sheet

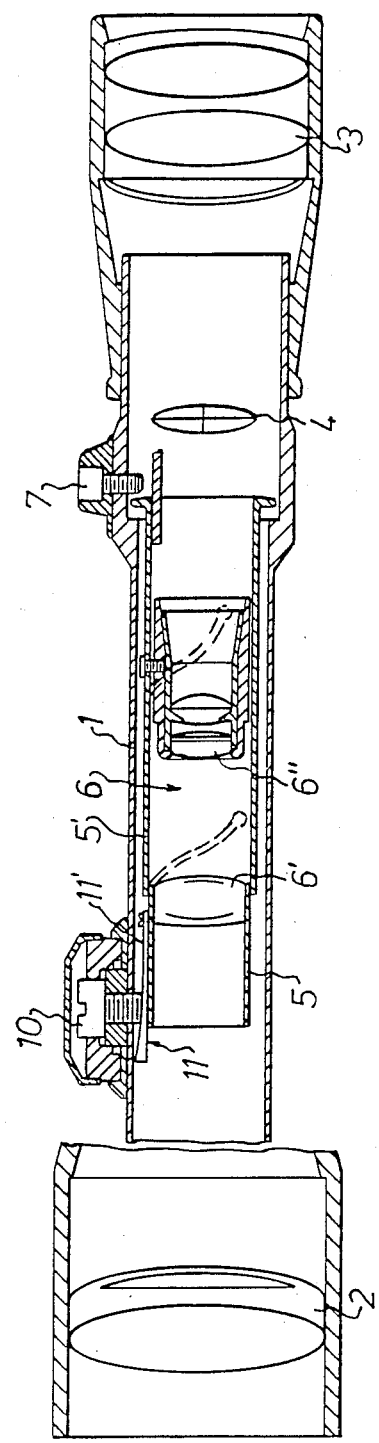

GUN SIGHTING TELESCOPE

This application is entitled to benefit of the filing date of International Application No. PCT/SE86/00218 filed May 9, 1986 under the Patent Cooperation Treaty.

BACKGROUND OF THE INVENTION

The present invention relates to a gun sighting telescope.

SUMMARY OF THE INVENTION

It is the object of the invention to provide a gun sighting telescope of the type referred to, in which a change of the magnification factor is automatically accompanied by a change of the elevation adjustment of the sighting telescope.

A further object of the invention is to provide a gun sighting telescope in which a point on the reticle or like sighting mark of the telescope covers an unvaryingly large area of a specific target, irrespective of the distance to the target, if the target is magnified in the sighting telescope by adjustment of the magnification factor to an image size which, to the eye, appears to be essentially the same. A specific object of the invention is to provide an arrangement which, in a gun sighting instrument of the type here concerned, automatically changes the elevation adjustment of the telescope with due regard to the distance to the target to compensate for the drop of a bullet following a specific, known trajectory.

These objects have now been achieved by imparting to the gun sighting telescope according to the invention the characteristic features stated in the claims.

BRIEF DESCRIPTION OF THE DRAWINGS

The invention will be described in more detail below, reference being had to the accompanying drawing which is a schematic and fragmentary axial section of a gun sighting telescope designed in accordance with the invention.

DETAILED DESCRIPTION OF PREFERRED EMBODIMENTS

The main components of the gun sighting telescope illustrated, such as the telescope barrel, i.e. the outer tube 1 with the objective lens 2, the ocular lens 3 and a reticle 4 in the object plane of the ocular lens, two relatively and axially adjustable holders, in this instance two telescopically displaceable inner tubes 5, with the associated inner lens system 6 and the adjusting device 7 for changing the magnification factor, are of per se known design and arranged in conventional manner.

A cam follower means 10 is mounted in the outer tube 1, and one of the inner tubes 5 is connected with a cam means 11, the cam surface 11' of which is engaged by the cam follower means 10. The cam means 11 preferably is resilient or spring-biased such that the two means 10, 11 will always be in contact with one another.

In the embodiment illustrated, the cam follower means 10 preferably is the elevation adjustment screw of the telescope, although the screw here acts upon the inner tube 5 via the cam means 11. Upon displacement of the two inner tubes 5, 5' by means of the adjusting device 7 for changing the distance between the lenses of the inner lens system, and thus the magnification factor, the cam means 11 is moved in an essentially straight axial path together with the corresponding inner tube 5 and thus in relation to the cam follower 10, the angle of elevation adjustment of the two inner tubes 5 within the outer tube 1 being changed in dependence upon the cam surface profile.

As already mentioned, the reticle 4 in the embodiment illustrated lies in the object plane of the ocular lens 3, and the image is not magnified by the reticle, at least not to any appreciable degree, if the magnification factor of the sighting telescope is increased.

This is important because in this manner a point, for example the crossing point, on the reticle will always cover an unvaryingly large area of a target which is located at varying distances from the sighting telescope but which, if the magnification factor of the telescope is changed, causes the marksman to see in the telescope an image which has not changed its size.

This in turn means that, if the marksman is aiming at a target, for example the head of a hare, and if the marksman by reticle selection has found that the above-mentioned point exactly covers the hare's head at a target distance of, for example 100 meters at a certain magnification factor, the point will cover the hare's head also at a distance of, for example, 500 meters, if the magnification factor is increased, so that the hare's head in both cases appears to the marksman's eye to be of unvarying size. Moreover, this means that, if the magnification factor of the sighting telescope is adjusted such that the point in question covers the head of a hare, the magnification of the sighting telescope has been essentially correctly adjusted, irrespective of the distance to the hare, or any hare, because the heads of different hares are not much different in size, at least from a practical point of view.

However, different ranges require compensation of the elevation of the sighting telescope in dependence on the trajectory. Bullets from cartridges of a given cartridge type (charge, weight of bullet, etc.) follow essentially the same trajectory when fired from a given type of bullet-firing firearm. The marksman who has knowledge of the trajectory selects such a cam profile for the cam means 11 that adjustment of the magnification factor of the sighting telescope is automatically accompanied by a correction of the elevation adjustment to compensate for the bullet drop along the trajectory. In the assumed case, the hare's head will therefore be hit by a sure marksman irrespective of the range within reasonable limits, say from 50 to 600 meters, provided that the above-mentioned point covers the hare's head, neither more nor less.

If the relative adjustment of the movable and the stationary components of the gun sighting telescope is graduated in meters instead of in the magnification factor, the marksman, if he so desires, obtains information of the range.

If the trajectory is a different one, it is of course necessary to use a different cam. It is possible to use a rotatable disk (not shown) or the like with different cams 11' for a limited number of different trajectories. If the cam means is mounted inside the outer tube 1, and if the cam follower is mounted on the outer side of the inner tube, such a disk etc. with different cams can be easily rotated or displaced by means of an adjusting member accessible on the outer side of the tube 1.

Instead of adjusting the sighting telescope such that a part of the recticle or like sighting mark covers an area corresponding to the head of a hare, it is of course possible to use a dot, a circle or any sighting mark whatsoever for covering areas which are fairly equal in size on any target whatsoever, for example the bull's-eye of a target or the head of a cardboard silhouette during field firing at different ranges, for which last-mentioned use the gun sighting telescope according to the invention is especially serviceable.

Naturally, the invention is not limited to gun sighting telescopes of the type illustrated in the drawing, but may be used with any sighting telescopes whatsoever, within the scope of the appended claims. Furthermore, the cam means and the cam follower may be designed differently and mounted in different positions than in the drawing, and of course also within the scope of the appended claims. In particular, it should be noted that the important feature is that either one of the cam follower/cam means is displaced together with one of two lens arrangements relatively and axially adjustable for varying the magnification factor and, in collaboration with the other of said cam follower/cam means, controls the angle between the optical axis of the inner lens system, i.e. the common center line of the inner lens arrangements 6', 6'', in relation to the common center line of the objective lens and the occular lens, such that the elevation adjustment of the sighting telescope is changed in dependence on the change of the magnification factor, in the manner described.

I claim:

1. A gun sighting telescoping a recticle (4) in the object plane of the ocular lens (3), a frame, a device (7) mounted on said frame for adjusting the axial distance between two lens arrangements (6', 6'') included in an inner lens system (6) between the ocular lens (3) and the objective lens (2) for changing the magnification factor of the sighting telescope, and at least one device for adjusting the angle of elevation of the sighting telescope in dependence on the adjustment of the magnification factor of the sighting telescope, said elevation angle adjusting device comprising a device consisting of a cam means (11) and a cam follower means (10), one of which is fixed relative to either one of the lens arrangements (6', 6'') of the inner lens system, the outer means being fixed relative to said frame (outer tube 1) of the sighting telescope, said cam means and said cam follower means (10, 11) are so arranged that, upon a change of the magnification factor, a change of the distance between the lens arrangements (6', 6'') of the inner lens system (6) automatically changes the elevation angle adjustment of the inner lens system and thus the angle between their common center line, i.e. the optical axis, and the corresponding axis of the objective lens (2) and the ocular lens (3) and said ocular lens (3) and said reticle (4) are so arranged relative to the rest of the lens system that upon a change of the magnification factor of the sighting telescope, the image of the reticle has essentially the same size such that a point on the reticle covers substantially the same area on an object whose image in the sighting telescope has been adapted, irrespective of the distance to said object, to a specific size of adjustment of the magnification factor.

2. A gun sighting telescope as claimed in claim 1 in which said cam means (11) has a profile so adapted to a given known trajectory that changing the elevation of the sighting telescope upon adjustment of the magnification factor for different ranges within at least a selected range area is automatically compensated for with regard to the bullet drop along the trajectory.

3. A gun sighting telescope as claimed in claims 1 or 2, in which said cam follower means (10) is a per se known elevation adjustment screw of the type usually provided on conventional sighting telescopes, said screw also providing means to actuate the inner tube (5) via the cam means (11).

4. A gun sighting telescope as claimed in claim 2 in which there are provided several cam means of one cam means having several cam profiles (11'), and that said cam means or cam profiles are designed to compensate for elevation adjustment of the sighting telescope, each for one trajectory, and are selectively adjustable for cooperation with the cam follower means (10).

* * * * *